Nov. 30, 1937.   L. L. BRANDT   2,100,938
MIRROR FOR VEHICLES
Filed Feb. 4, 1935
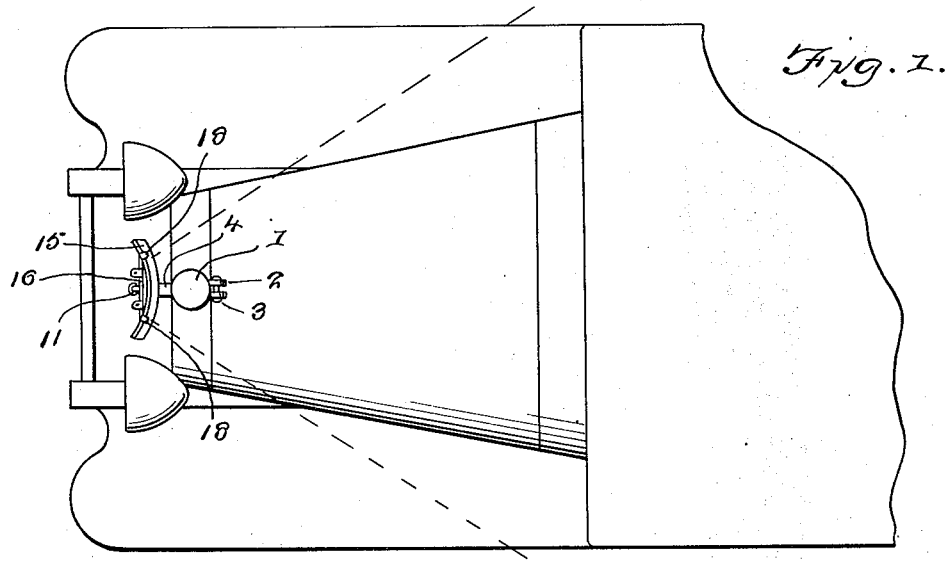
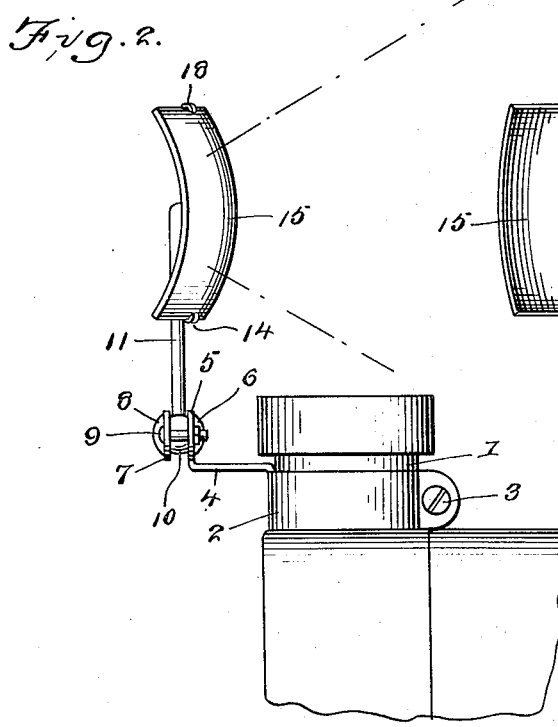
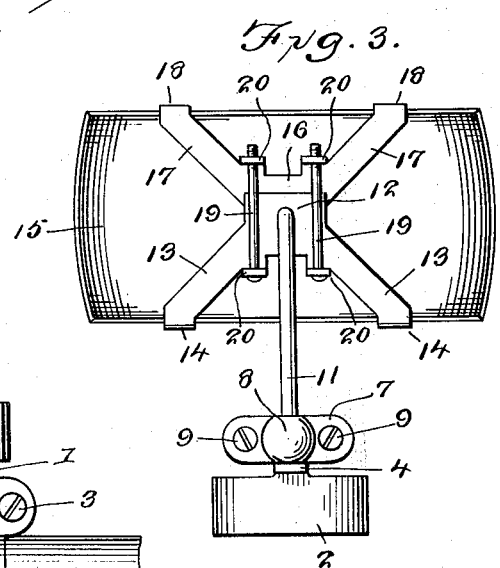
Leo L. Brandt
INVENTOR
BY *Victor J. Evans & Co.*
ATTORNEY Patented Nov. 30, 1937

2,100,938

UNITED STATES PATENT OFFICE 2,100,938

MIRROR FOR VEHICLES

Leo L. Brandt, Savannah, Mo.

Application February 4, 1935, Serial No. 4,935

1 Claim. (Cl. 88—98)

This invention relates to rear view mirrors for motor vehicles and seeks to provide a mirror which will give a view of an intersecting road as well as a direct view to the rear. The invention is illustrated in the accompanying drawing and will be hereinafter fully described, the novel features being particularly defined in the appended claim.

In the drawing:

Figure 1 is a plan view of a portion of a motor vehicle having my mirror mounted thereon.

Figure 2 is an end elevation of the mirror and its mounting.

Figure 3 is a front elevation of the same.

The mirror of the present invention is intended to be mounted upon the radiator filling nozzle 1 or upon the radiator shell near the nozzle, and for that purpose there is shown a split collar 2 adapted to encircle the nozzle and be secured thereto by a clamping bolt 3. A bracket 4 extends upwardly and forwardly from the collar in front of the nozzle and is provided with a cross head 5 having a central recess or cup 6 therein. A plate 7 having a recess or cup 8 therein is connected with the head 5 by bolts 9 and the two recesses or cups form a socket receiving a ball 10 on the lower end of a post 11, the parts cooperating to permit the post to be swung in a vertical plane on the ball and socket joint as a pivot and to be set and held in any desired adjusted position. Contact of the post 11 with either of the bolts 9 limits angular adjustment of the post on the bracket 4. At its upper end, the post carries a bracket comprising a plate 12 from which depend diverging arms 13 having hooks 14 at their ends to engage the lower edge of the mirror 15. An upper similar bracket comprises a plate 16 placed back of the plate 12 and having diverging arms 17 extending upwardly therefrom, said arms terminating in hooks 18 which engage the upper edge of the mirror. Bolts 19 fitted in lugs 20 on the plates 12 and 16 secure the brackets together so that the mirror will be firmly clamped and held. The mirror, as shown clearly in Figures 1 and 2, is curved both horizontally and vertically so that its rear reflecting surface is convex and forms a section of a sphere.

Rear view mirrors now in use provide a view of the road at the rear of the vehicle but do not give a view of a road at the right which intersects, at an acute angle, the road on which the vehicle is traveling. My mirror meets this condition, the lengthwise or horizontal convexity providing for views of roads at the right or left as indicated by the dotted lines in Figure 1, and the location of the mirror on the radiator enables the driver of the vehicle to read the entire mirror without discomfort. If the intersecting road is level its reflection will appear in the middle horizontal zone of the mirror while the upper portion of the vertical convexity will reflect a down grade and the lower portion thereof will reflect an upgrade, as indicated by the dotted lines in Figure 2. It will be seen from the foregoing description that I have provided a rear view mirror free of the noted defects in present-day mirrors. The mirror may be easily set in any desired position, and when once adjusted will need no further attention.

Having described my invention, what I claim is:

A rear view mirror for mounting above the radiator cap of an automobile for viewing the road to both sides of the automobile, said rear view mirror including a clamp for attachment to the automobile radiator nozzle with a bracket extending upwardly and forwardly therefrom, a cross head on the bracket having a central cup, a plate having a cup, a pair of bolts passed through the ends of the plate and the cross head, said cups forming a ball receiving socket, a post, a ball on the lower end of the post received in said socket, the ball and socket permitting the post to be swung in a vertical plane to either side of said bracket as well as permitting turning of the post, said angular adjustment of the post being limited by contact of the post with either of said bolts, a bracket on the upper end of the post, and a convex mirror supported by the bracket.

LEO L. BRANDT.